US012224788B2

United States Patent
Oh et al.

(10) Patent No.: US 12,224,788 B2
(45) Date of Patent: Feb. 11, 2025

(54) MAGNETIC AUXILIARY DEVICES FOR MOBILE DEVICES

(71) Applicant: SPIGEN KOREA CO., LTD., Seoul (KR)

(72) Inventors: Seung Hun Oh, Seoul (KR); Hyejin Jang, Bucheon-si (KR); Dae Young Kim, Seoul (KR); Jinyoung Noh, Seoul (KR); Taeheon Kim, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 18/660,932

(22) Filed: May 10, 2024

(65) Prior Publication Data
US 2024/0297676 A1     Sep. 5, 2024

Related U.S. Application Data

(60) Continuation-in-part of application No. 18/518,303, filed on Nov. 22, 2023, and a continuation-in-part of application No. 18/518,265, filed on Nov. 22, 2023, which is a continuation of application No. 17/443,183, filed on Jul. 22, 2021, now Pat. No.
(Continued)

(51) Int. Cl.
*H04B 1/3888* (2015.01)
*A45C 11/00* (2006.01)
*A45C 13/10* (2006.01)
*H02J 7/00* (2006.01)
*H02J 50/10* (2016.01)
*H04B 5/00* (2024.01)
*H04B 1/3877* (2015.01)

(52) U.S. Cl.
CPC ............ *H04B 1/3888* (2013.01); *A45C 11/00* (2013.01); *A45C 13/1069* (2013.01); *H02J 7/0042* (2013.01); *H02J 50/10* (2016.02); *A45C 2011/002* (2013.01); *A45C 2011/003* (2013.01); *H04B 1/3877* (2013.01)

(58) Field of Classification Search
CPC .. H04B 1/3888; H04B 1/3877; H04B 1/3883; H04B 5/0081; H04B 5/0037; A45C 11/00; A45C 13/1069; A45C 2011/002; A45C 2011/003; H02J 7/0042; H02J 50/10; H04M 1/6058
See application file for complete search history.

(56) References Cited

U.S. PATENT DOCUMENTS

| 8,188,826 B2 | 5/2012 | Okada et al. |
| 8,746,448 B1 | 6/2014 | Bellace |

(Continued)

*Primary Examiner* — Andrew Wendell
(74) *Attorney, Agent, or Firm* — Bridgeway IP Law Group, PLLC; Jihun Kim (57) ABSTRACT

Devices and products for enhancing the usability of magnetic auxiliary devices for mobile device are described. According to one embodiment, a magnetic auxiliary device for mobile device comprises a first case sized to store at least one item, the first case comprising a first metal plate formed at a position of the first case to magnetically couple with the mobile device or with a case of the mobile device and a second case pivotally attached to the first case, the second case comprising a second metal plate formed at a position of the second case to magnetically couple with another magnetic auxiliary device for mobile device.

18 Claims, 10 Drawing Sheets

Related U.S. Application Data 11,863,223, said application No. 18/518,303 is a continuation of application No. 17/443,183, filed on Jul. 22, 2021, now Pat. No. 11,863,223, which is a division of application No. 16/581,596, filed on Sep. 24, 2019, now Pat. No. 11,101,838, which is a continuation of application No. 15/989,033, filed on May 24, 2018, now Pat. No. 10,469,119.

(60) Provisional application No. 62/511,280, filed on May 25, 2017.

(56) References Cited

U.S. PATENT DOCUMENTS

| | | | |
|---|---|---|---|
| 9,025,317 | B2 | 5/2015 | Richardson et al. |
| 9,084,343 | B2 | 7/2015 | Waffenschmidt |
| 9,484,769 | B2 | 11/2016 | Kim |
| 9,486,910 | B2 | 11/2016 | Stevens et al. |
| 9,842,688 | B2 | 12/2017 | Kurs et al. |
| 9,935,669 | B1 | 4/2018 | Kuo |
| 10,003,217 | B2 | 6/2018 | Kuerschner et al. |
| 10,097,038 | B2 | 10/2018 | Leem |
| 10,291,058 | B2 | 5/2019 | Kato et al. |
| 10,469,119 | B2 | 11/2019 | Kim |
| 11,101,838 | B2 | 8/2021 | Kim |
| 11,863,223 | B2 | 1/2024 | Kim |
| 2002/0153074 | A1 * | 10/2002 | Chen .................. A45C 3/06 190/110 |
| 2010/0018315 | A1 | 1/2010 | Wang et al. |
| 2011/0050164 | A1 | 3/2011 | Partovi et al. |
| 2011/0148352 | A1 | 6/2011 | Wang et al. |
| 2011/0192857 | A1 | 8/2011 | Rothbaum et al. |
| 2011/0228458 | A1 | 9/2011 | Richardson et al. |
| 2012/0151973 | A1 | 6/2012 | Cheung |
| 2012/0235636 | A1 | 9/2012 | Partovi |
| 2013/0229148 | A1 | 9/2013 | Khan et al. |
| 2013/0300220 | A1 | 11/2013 | Weiss |
| 2014/0062799 | A1 | 3/2014 | Sutherland et al. |
| 2014/0321052 | A1 | 10/2014 | Diebel et al. |
| 2014/0354218 | A1 | 12/2014 | Kaynar et al. |
| 2015/0048752 | A1 | 2/2015 | Van Den Brink et al. |
| 2015/0111621 | A1 | 4/2015 | Smith |
| 2015/0123604 | A1 | 5/2015 | Lee et al. |
| 2015/0214749 | A1 | 7/2015 | Park et al. |
| 2015/0222018 | A1 | 8/2015 | Kumura et al. |
| 2016/0003270 | A1 | 1/2016 | Franklin |
| 2016/0051019 | A1 | 2/2016 | Sirichai |
| 2016/0056664 | A1 * | 2/2016 | Partovi .................. B60L 53/122 307/104 |
| 2016/0119036 | A1 | 4/2016 | Yang et al. |
| 2016/0236626 | A1 | 8/2016 | Yialamas |
| 2016/0241046 | A1 | 8/2016 | Lee et al. |
| 2016/0294427 | A1 * | 10/2016 | Wojcik ................ H04B 1/3888 |
| 2016/0318455 | A1 | 11/2016 | Zhang et al. |
| 2016/0352151 | A1 * | 12/2016 | Standke ................ H02J 7/0042 |
| 2017/0026498 | A1 * | 1/2017 | Goldfain ................ H02J 7/342 |
| 2017/0035172 | A1 | 2/2017 | Kim |
| 2017/0062999 | A1 | 3/2017 | Thiers |
| 2017/0063128 | A1 | 3/2017 | Van Bosch et al. |
| 2017/0077727 | A1 | 3/2017 | Kim et al. |
| 2017/0098952 | A1 | 4/2017 | Winkler |
| 2017/0098958 | A1 * | 4/2017 | Yio ........................ H01F 38/14 |
| 2017/0117085 | A1 | 4/2017 | Mao et al. |
| 2017/0155418 | A1 | 6/2017 | Kim |
| 2017/0170678 | A1 | 6/2017 | Uhm |
| 2017/0196331 | A1 * | 7/2017 | Gluck .................. A45C 11/182 |
| 2017/0264725 | A1 | 9/2017 | Holder |
| 2017/0338676 | A1 | 11/2017 | Yan |
| 2018/0069294 | A1 | 3/2018 | Kang et al. |
| 2018/0109132 | A1 | 4/2018 | Cho et al. |
| 2018/0166905 | A1 | 6/2018 | Park et al. |
| 2018/0343025 | A1 | 11/2018 | Kim |
| 2024/0014580 | A1 | 1/2024 | Schneider |

* cited by examiner

MAGNETIC AUXILIARY DEVICES FOR MOBILE DEVICES

CROSS-REFERENCE TO RELATED APPLICATIONS

This application is a continuation-in-part application of and claims priority to U.S. application Ser. No. 18/518,265 and U.S. application Ser. No. 18/518,303 filed on Nov. 22, 2023 and both entitled "magnetic mount for electronic device," which are Continuation Applications of and claim priority to U.S. patent application Ser. No. 17/443,183 filed on Jul. 22, 2021 and patented as the U.S. Pat. No. 11,863,223 on Jan. 2, 2024, which is a Divisional Application of and claims priority to U.S. patent application Ser. No. 16/581,596 filed on Sep. 24, 2019 and patented as the U.S. Pat. No. 11,101,838 on Aug. 24, 2021, which is a Continuation Application of and claims priority to U.S. patent application Ser. No. 15/989,033 filed on May 24, 2018 and patented as U.S. Pat. No. 10,469,119 on Nov. 5, 2019, which claims priority to U.S. Provisional Patent Application No. 62/511,280, filed on May 25, 2017, the disclosures of which are incorporated herein by reference in their entirety.

FIELD

The present disclosure is related to magnetic auxiliary devices for mobile devices, more specifically to magnetic card holder devices for mobile devices.

BACKGROUND

A magnetic material is embedded inside a mobile device, such as a smartphone, and an auxiliary device capable of magnetic coupling to the magnetic material may be magnetically coupled to the mobile device, where the auxiliary device may be used for various purposes.

For example, the auxiliary device may be a storage device with an advantage of holding portable items, such as credit cards, coins, etc., thus providing a storage space which is generally not affordable in the mobile device, while maintaining a magnetically coupled state with the mobile device. The magnetically coupled state may be realized by a ferromagnetic material installed in the auxiliary device, where the ferromagnetic material of the auxiliary device is magnetically attracted to the magnetic material embedded inside the mobile device.

In another example, the auxiliary device may be a magnetic ring which is used to assist the user of the mobile device to get a better handle on the mobile device through preventing the mobile device from slipping and falling and to stay stable. In yet another example, the auxiliary device may be a magnetic car mount which is configured to be mounted to an air vent of a car so that the mobile device may be magnetically coupled on a base of the magnetic car mount, thus allowing a hands-free experience to the user of the mobile device when driving the car.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure includes multiple embodiments for enhancing auxiliary storage for mobile devices using a magnetic auxiliary device.

According to one embodiment, a magnetic auxiliary device for mobile device comprises a first case sized to store at least one item, where the first case comprises a first metal plate formed at a position of the first case to magnetically couple with the mobile device or a case of the mobile device. Additionally, the magnetic auxiliary device for mobile device comprises a second case pivotally attached to the first case and pivotable between an open position and a closed position, where the first case is uncovered in the open position and the first case is covered in the closed position and where the second case comprises a second metal plate formed at a position of the second case to magnetically couple with another magnetic auxiliary device for mobile device.

According to another embodiment, a magnetic card holder device for mobile device comprises a rear case sized to retain a card, where the rear case comprises a pocket portion to hold at least one card, a release mechanism formed on a side of the rear case and a first metal plate formed at a position of the rear case to magnetically couple with the mobile device or a case of the mobile device. The magnetic card holder device further comprises a cover case pivotally attached to the rear case and pivotable between an open position and a closed position, where the cover case comprises a second metal plate formed at a position of the cover case to magnetically couple with a support device. According to the embodiment, the rear case is uncovered in the open position and the rear case is covered in the closed position, and the release mechanism retains the cover case in the closed position and the release mechanism releases the cover case in the open position.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the claims. Furthermore, in the detailed description of the present disclosure, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure embodiments of the present disclosure.

Currently, there are many types of magnetic auxiliary devices for mobile device in the market. For example, a magnetic card holder device, which is magnetically coupled with the mobile device or a case of the mobile device, is employed to provide a storage space to the user of the mobile device. In another example, a magnetic ring, which is magnetically coupled with the mobile device or the case of the mobile device, is used to provide the user a good handling of the mobile device. In yet another example, a magnetic car mount, which is magnetically coupled with the mobile device or the case of the mobile device, is used to provide a hands-free experience to the user. However, for each of these magnetic auxiliary devices, which are equipped with a magnetic material formed on one side of the magnetic auxiliary devices, there is no means to conveniently use two or more magnetic auxiliary devices together with the mobile device.

To deal with this issue, embodiments of the present disclosure propose a magnetic auxiliary device comprising two covers to store at least one storage item with two ferromagnetic metal plates formed on both covers of the magnetic auxiliary device, while not interfering with the wireless charging of the mobile device with its case on or off.

Figure 1A:
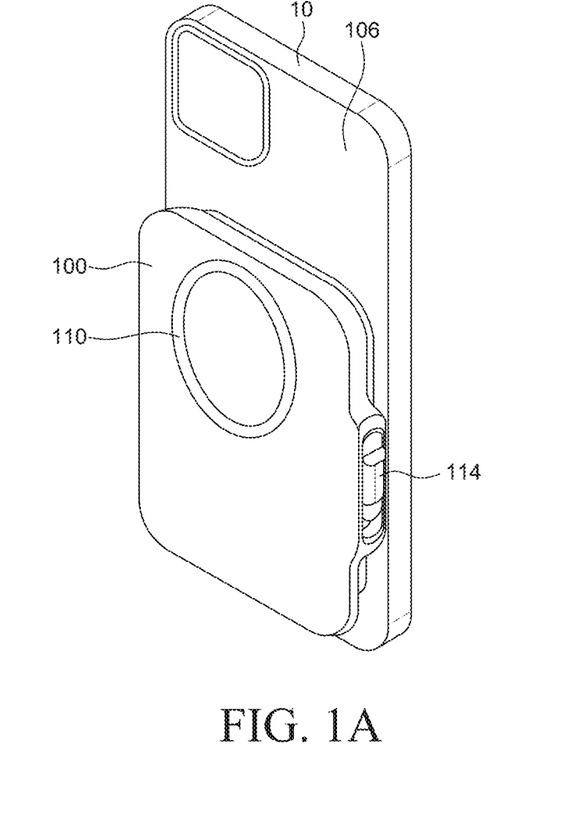
FIGS. 1A through 1D illustrate views of a magnetic auxiliary device for mobile device, according to an embodiment of the present disclosure.
Figure 1B:
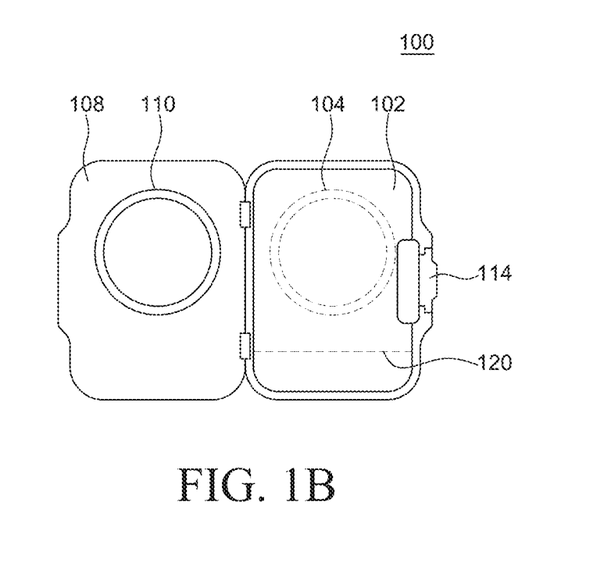
Figure 1C:
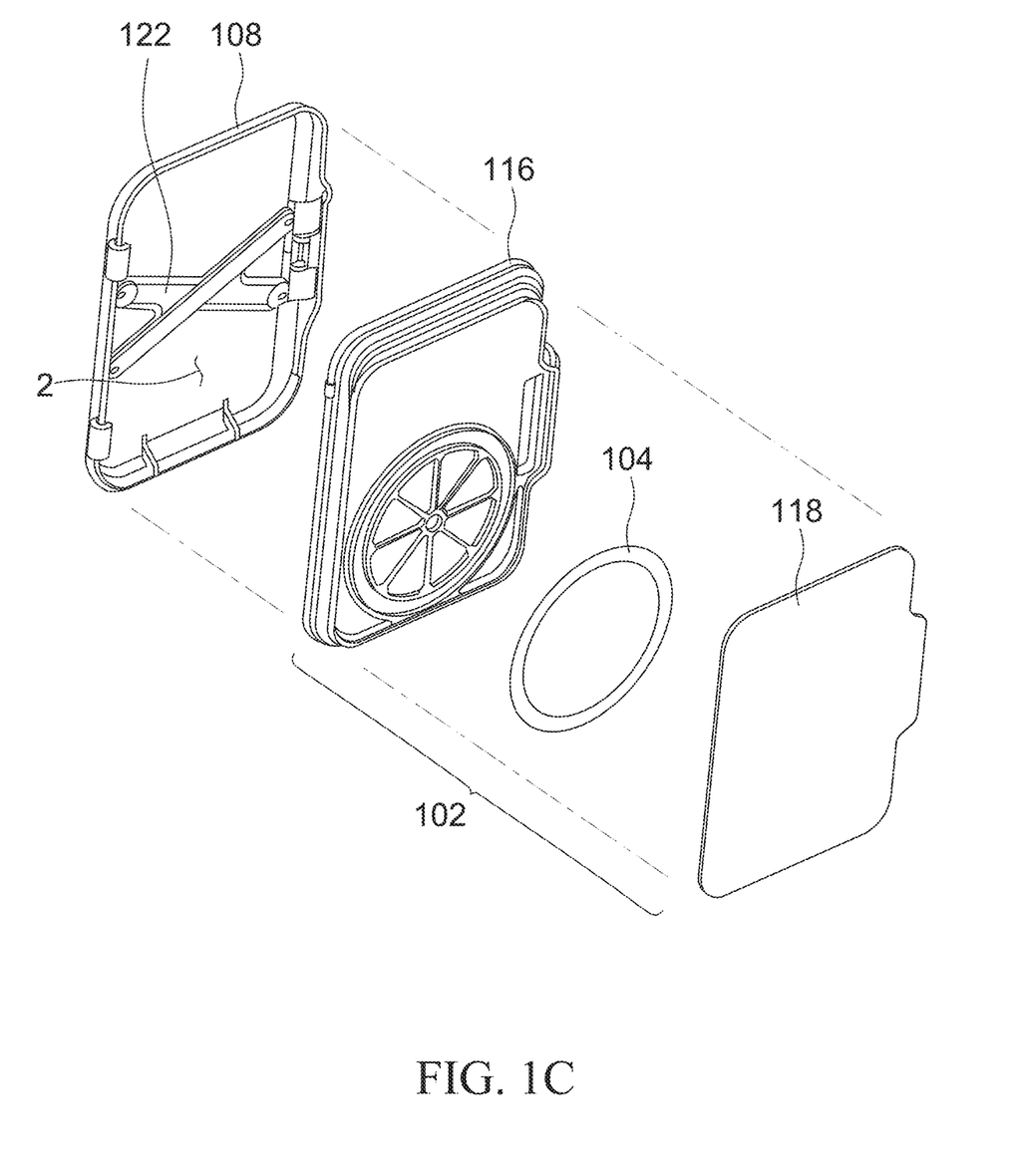
Figure 1D:
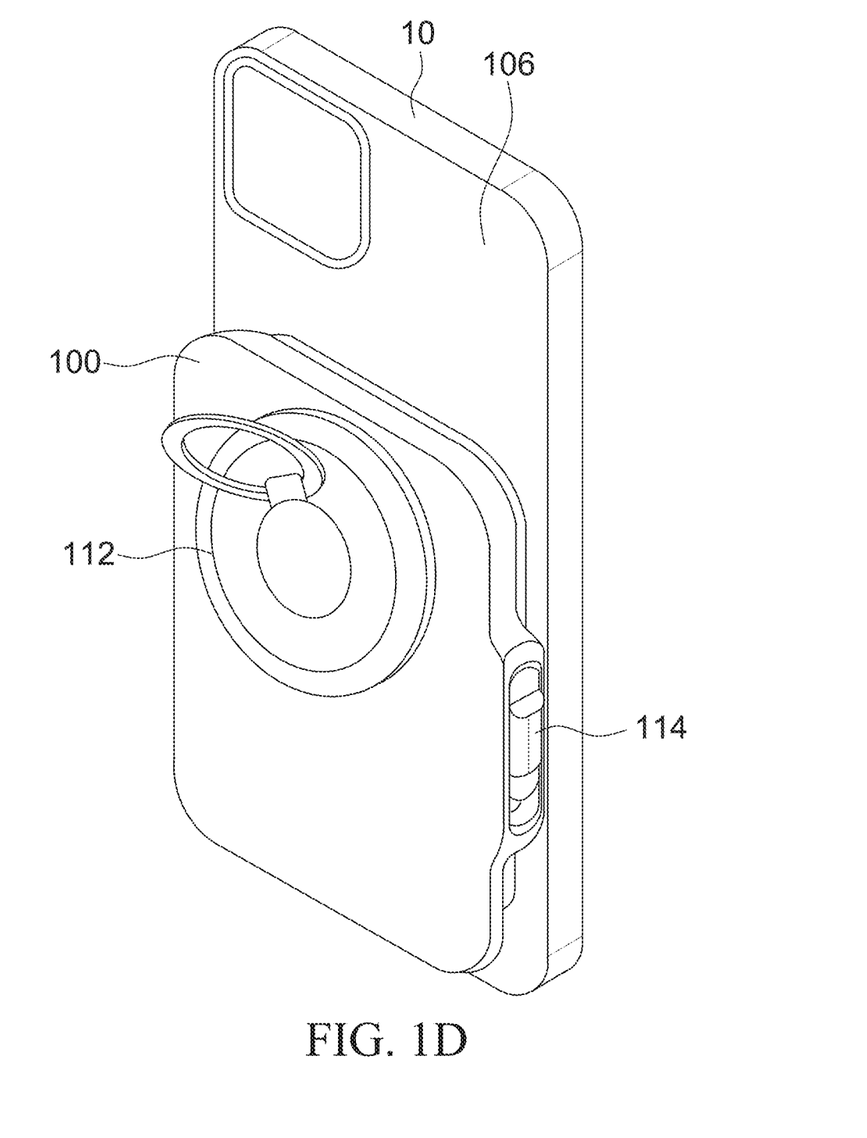

FIGS. 1A through 1D illustrate views of a magnetic auxiliary device 100 for mobile device 10, according to an embodiment of the present disclosure. Particularly, FIG. 1A illustrates a perspective view of the magnetic auxiliary device 100 coupled with the mobile device 10 enclosed in a case 106, according to one embodiment. FIG. 1B illustrates a plan view of the magnetic auxiliary device 100 in an open state, according to one embodiment. FIG. 1C illustrates an exploded view of the magnetic auxiliary device 100, according to one embodiment. FIG. 1D illustrates a perspective view of the magnetic auxiliary device 100 coupled with another magnetic auxiliary device (e.g., magnetic ring 112), according to one embodiment.

According to one example embodiment, as shown in FIGS. 1A though 1D, the magnetic auxiliary device 100 for mobile device 10 comprises a first case 102 sized to store at least one item, where the first case 102 comprising a first metal plate 104 formed at a position of the first case 102 to magnetically couple with the mobile device 10 or the case 106 of the mobile device 10. It is appreciated that the first metal plate 104 is made of a magnet or ferromagnetic material. The first case 102 additionally comprises a detachable main body 116 and a frontal cover 118. The magnetic auxiliary device 100 also comprises a second case 108 pivotally attached to the first case 102 and pivotable between an open position and a closed position, where the first case 102 is uncovered in the open position and the first case is covered in the closed position. In addition, the second case 108 comprises a second metal plate 110 formed at a position of the second case 108 to magnetically couple with another magnetic auxiliary device (e.g., the magnetic ring 112) for mobile device 10. It is appreciated that the second metal plate 110 is made of a magnet or ferromagnetic material.

According to one example embodiment, as shown in FIGS. 1A though 1D, in the magnetic auxiliary device 100, the first case 102 comprises a release mechanism 114 formed on a side of the first case 102. In one example embodiment, the second metal plate 110 is formed in a shape of a ring, as illustrated in FIG. 1A and FIG. 1B. In one example embodiment, the second metal plate 110 is formed substantially close to a surface of the second case 108 to provide an ample magnetic power between the second metal plate 110 of the magnetic auxiliary device 100 and the additional magnetic auxiliary device (e.g., the magnetic ring 112). In one example embodiment, the first case 102 further comprises a pocket holder 120 affixed therein to retain at least one card (e.g., credit card). In one example embodiment, the second case 108 further comprises a silicone holder 122 affixed therein to retain at least one card (e.g., credit card). In one example embodiment, the outer covers (e.g., the first case 102 and the second case 108) are made of polycarbonate, the pocket holder 120 is made of thermoplastic polyurethane (TPU), the inside of the first case 102 is made of polyurethane (PU) or suede, and the silicone holder 122 is made of silicone.

Figure 1E:
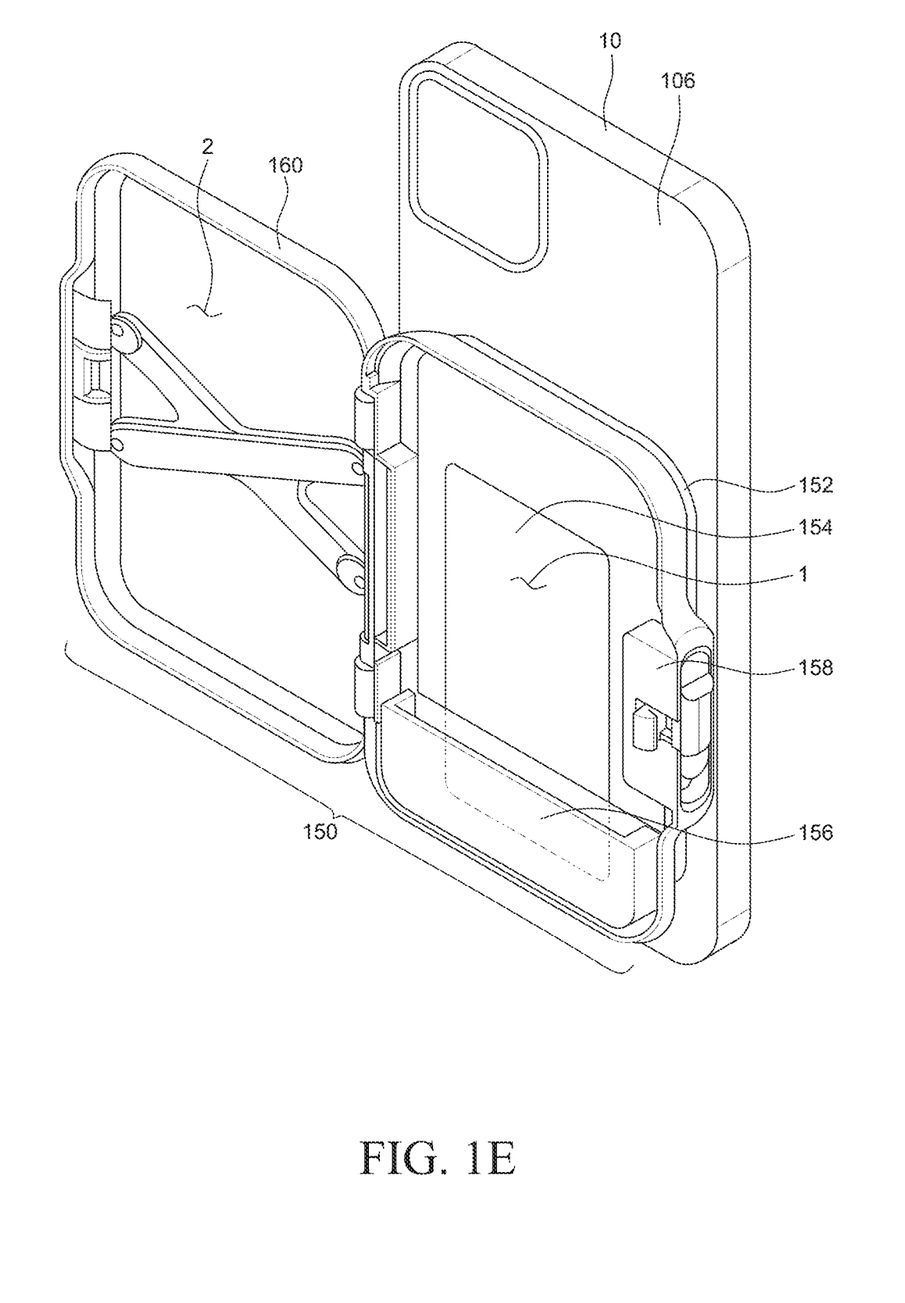
FIG. 1E illustrates a perspective view of a magnetic card holder device for mobile device, according to an embodiment of the present disclosure.

FIG. 1E illustrates a perspective view of a magnetic card holder device 150 for mobile device 10, according to an embodiment of the present disclosure. In FIG. 1E, the magnetic card holder device 150 comprises a rear case 152 sized to retain a card 154 (e.g., a credit card), where the rear case 152 comprising a pocket portion 156 to hold one or more cards (e.g., credit cards) through forming a storage space 1, a release mechanism 158 formed on a side of the rear case 152 and a first metal plate (e.g., the first metal plate 104) formed at a position of the rear case 152 to magnetically couple with the mobile device 10 directly or with the case 106 of the mobile device 10.

The magnetic card holder device 150 further comprises a cover case 160 designed to form a storage space 2 and pivotally attached to the rear case 152 and pivotable between an open position and a closed position, where the rear case 152 is uncovered in the open position and is covered in the closed position. In one example embodiment, the cover case 160 comprises a second metal plate (e.g., the second metal plate 110) formed at a position of the cover case 160 to magnetically couple with a support device, such as the magnetic ring 112 of FIG. 1D. In one example embodiment, the release mechanism 158 retains the cover case 160 in the closed position and the release mechanism 158 releases the cover case 160 in the open position.

Figure 2A:
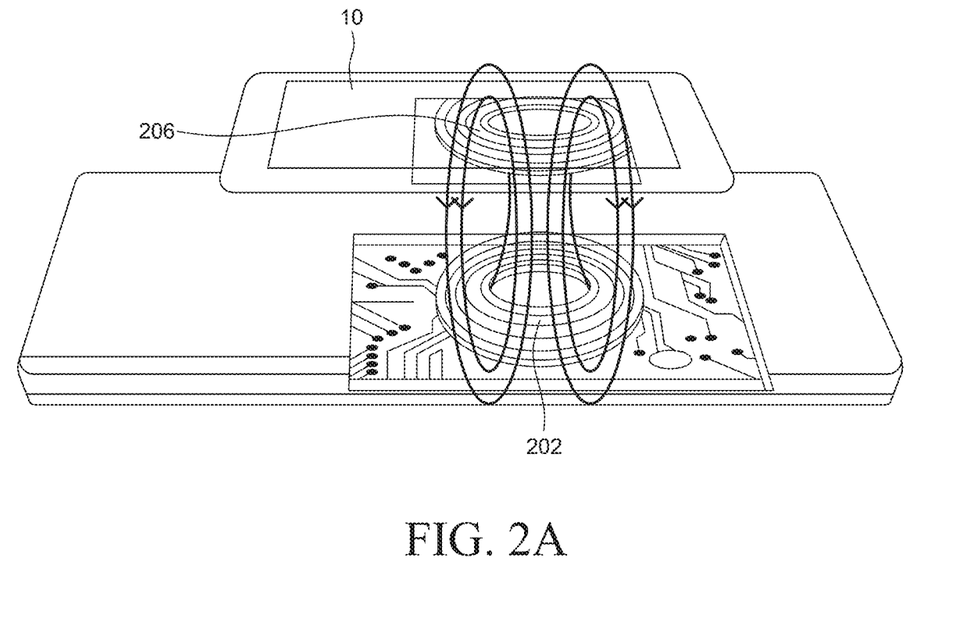
FIG. 2A shows a schematic drawing to illustrate how wireless charging using a transmitter coil and a receiver coil works.
Figure 2B:
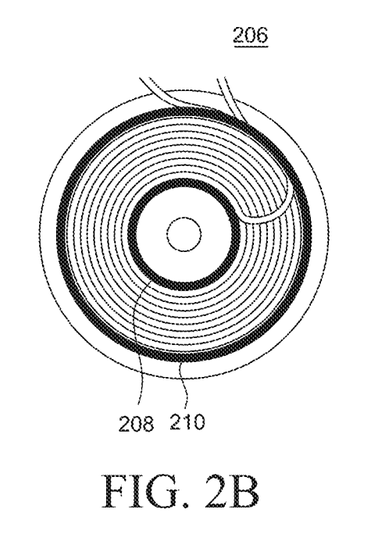
FIGS. 2B and 2C show the receiver circuit or receiver coil of FIG. 2A.
Figure 2C:
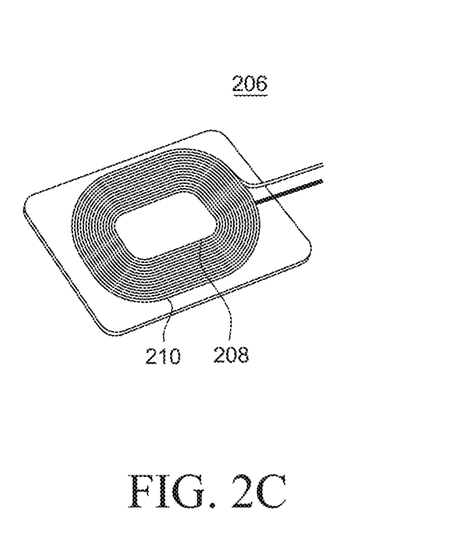

FIG. 2A shows a schematic drawing to illustrate how wireless charging works using a transmitter coil 202 and receiver coil 206 or receiver circuit, and FIGS. 2B and 2C show the receiver coil 206 of FIG. 2A. In FIG. 2A, the transmitter coil 202 in the charging base sends out a signal, where the signal searches for the receiver coil 206 or a receiver circuit, like the one in the mobile device 10 (e.g., a smart phone). When the receiver coil 206 senses the signal, electromagnetic induction begins, where the electrons (electricity) inside the transmitter coil 202 start to flow around in the coil, thus generating a magnetic field, which is sensed by the electrons in the receiver coil 206. The electrons trapped inside the receiver coil 206 start to flow around the coil due to the magnetic field, and this flow of electrons inside the receiver coil 206 is the electricity powering the battery in the mobile device 10.

In FIGS. 2B, in one example embodiment, an inner boundary 208 and an outer boundary 210 are circular. Alternatively, the inner boundary 208 and the outer boundary 210 may be rectangular with rounded corners as in FIG. 2C.

Figure 3A:
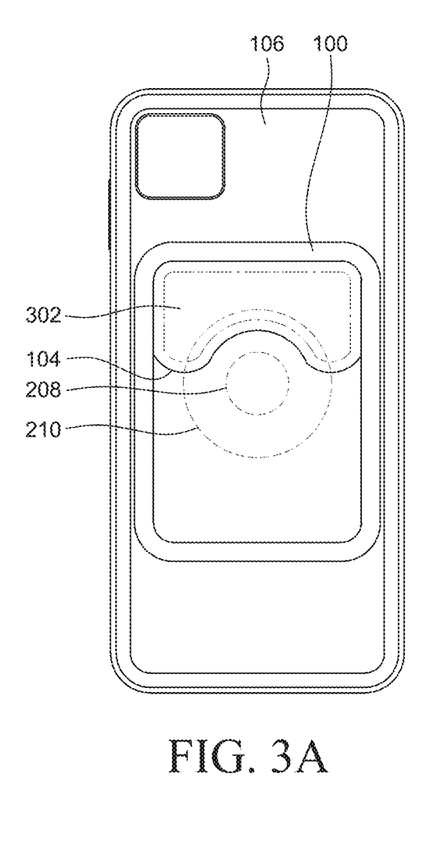
FIGS. 3A and 3B illustrate an overlap of a third metal plate of a case of mobile phone and a first metal plate of the magnetic auxiliary device of FIGS. 1A though 1D, according to one embodiment the present disclosure.
Figure 3B:
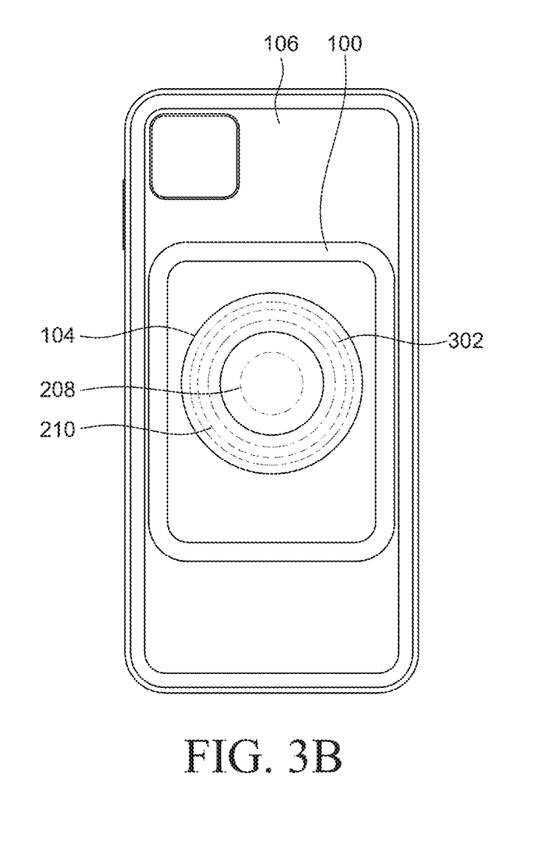

FIGS. 3A and 3B illustrate an overlap of a third metal plate 302 of the case 106 of mobile device 10 and the first metal plate 104 of the magnetic auxiliary device 100 of FIGS. 1A though 1D, according to one embodiment of the present disclosure. In one example embodiment, the third metal plate 302 is made of a magnet or ferromagnetic material. In one example embodiment, the third metal plate 302 is constructed to enable magnetic retention or attachment of the case 106 to the magnetic auxiliary device 100.

As illustrated in FIGS. 3A and 3B, when the third metal plate 302 is attached to the case 106 and the mobile device 10 is enclosed in the case 106, the third metal plate 302, the inner boundary 208 and the outer boundary 210 are substantially symmetrical with respect to the same line. The inner boundary 208 and the outer boundary 210 are generally concentric, and the third metal plate 302 may or may not be concentric as well. FIGS. 3A and 3B show various relative locations between the third metal plate 302, the inner boundary 208 and the outer boundary 210.

In one example embodiment, the third metal plate 302 may be placed in between the inner boundary 208 and the outer boundary 210. Alternatively, the third metal plate 302 may overlap with the outer boundary 210, or the third metal plate 302 may be placed outside the outer boundary 210. However, the third metal plate 302 does not overlap with the inner boundary 208, as illustrated in FIGS. 3A and 3B, so that the third metal plate 302 does not block the electromagnetic field or substantially impede or prevent wireless charging of the mobile device 10 enclosed in the case 106.

As in FIG. 3A, the third metal plate 302 may be substantially rectangular with one side having a rounded concave edge, as illustrated in FIG. 3A. In addition, the third metal plate 302 may have rounded corners, preferably, all four corners are rounded. In an alternative embodiment as in FIG. 3B, the third metal plate 302 may be substantially a ring wherein the ring circumscribes the receiver coil 206, where the inner circumference of the ring does not block any of the inner boundary 208 of the receiver coil 206. In one example embodiment, the third metal plate 302 is attached to the case 106 by an adhesive. Preferably, the adhesive is a double-sided adhesive.

In one example embodiment, as illustrated in FIGS. 3A and 3B, when the first metal plate 104 is directly coupled with the case 106 of the mobile device 10, the first metal plate 104 is formed to couple with the third metal plate 302 formed in the case 106 of the mobile device 10, where the third metal plate 302 is made of a magnet which produces magnetic flux, where the third metal plate 302 is formed to allow magnetic waves to substantially pass through an area formed by the inner boundary 208 of the receiver coil 206 of the mobile device 10, and where the third metal plate 302 does not overlap with an orthographic parallel projection of the area formed by the inner boundary 208 of the receiver coil 206.

In one example embodiment, the shape of the first metal plate 104 is substantially similar to the shape of the third metal plate 302 so that the maximum magnetic attraction between the case 106 of the mobile device 10 and the magnetic auxiliary device 100 may be realized. As illustrated in FIG. 3A, for example, the shape of the first metal plate 104 is rectangular with a concave side to match the shape of the third metal plate 302. In another example, as illustrated in FIG. 3B, the shape of the first metal plate do 104 is a ring to match the shape of the third metal plate 302.

In each case where the magnetic auxiliary device 100 couples with the case 106 or directly couples with the mobile device 10, the position of the first metal plate 104 should remain the same. Accordingly, when the first metal plate 104 is directly coupled with the mobile device 10, the first metal plate 104 is formed to allow magnetic waves to substantially pass through an area formed by the inner boundary 208 of the receiver coil 206 of the mobile device 10 and the first metal plate 104 does not overlap with an orthographic parallel projection of the area formed by the inner boundary 208 of the receiver coil 206.

Figure 4A:
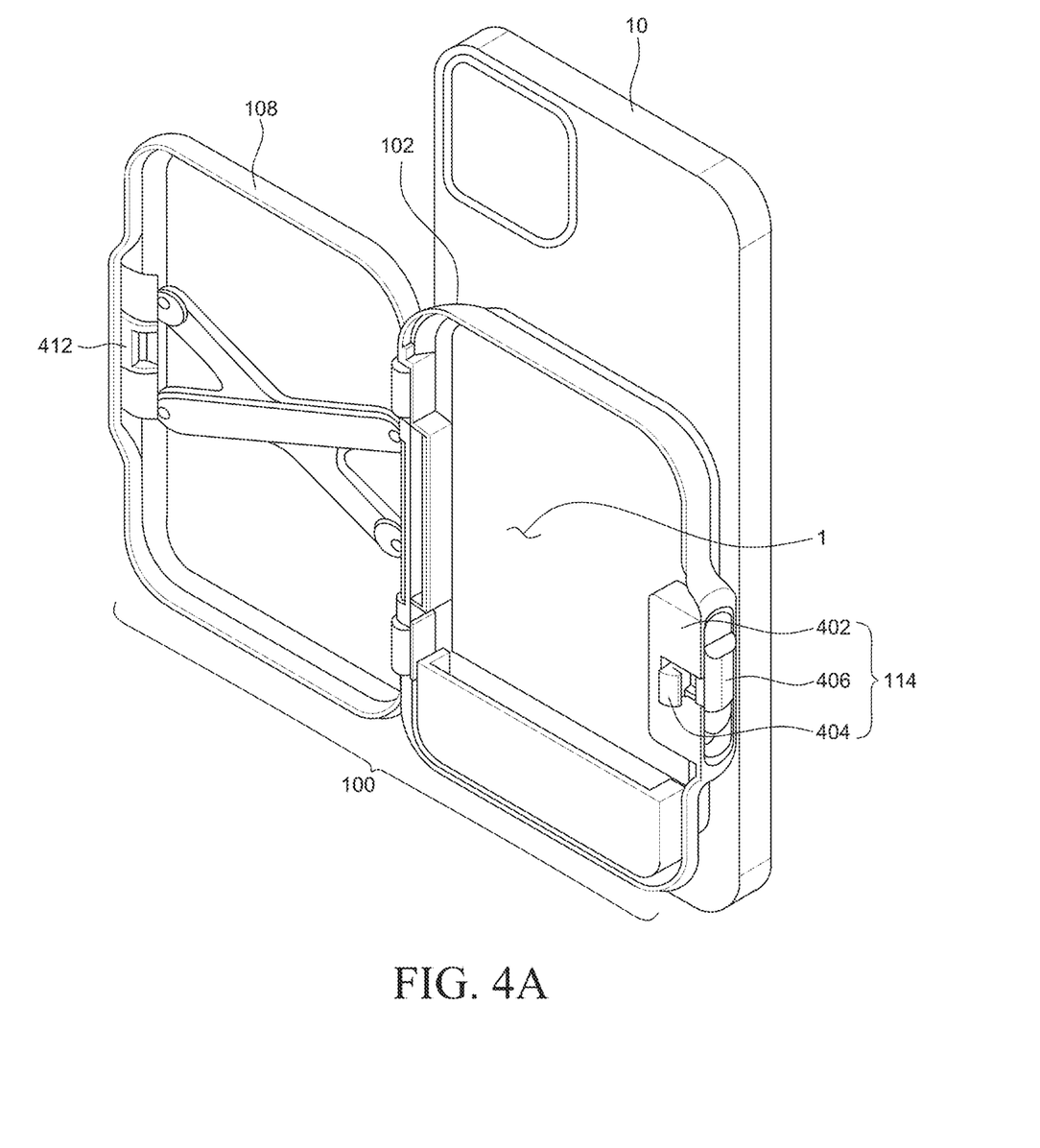
FIG. 4A illustrates a perspective view of the magnetic auxiliary device of FIGS. 1A through 1D comprising a release mechanism, according to one embodiment of the present disclosure.
Figure 4B:
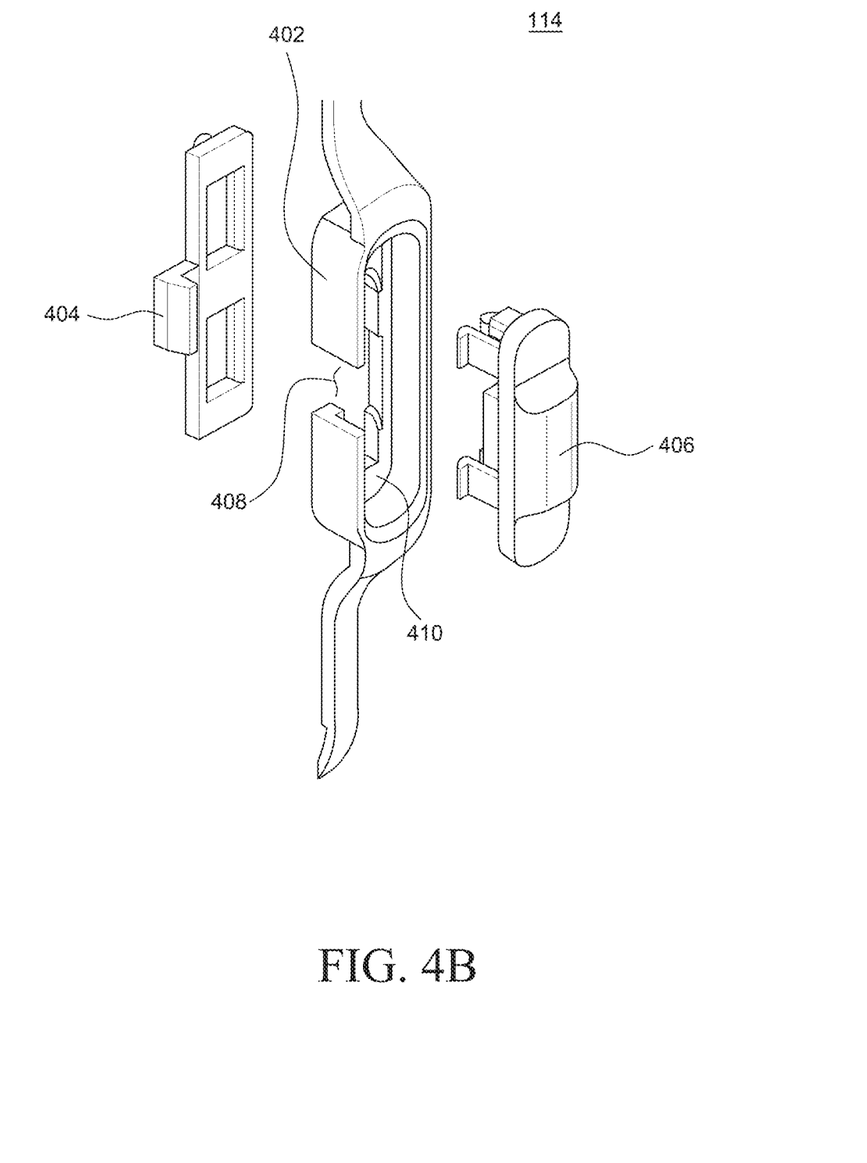
FIG. 4B illustrates an exploded view of the release mechanism of FIG. 4A, according to one embodiment of the present disclosure.

FIG. 4A illustrates a perspective view of the magnetic auxiliary device 100 of FIGS. 1A through 1D comprising a release mechanism 114, according to one embodiment of the present disclosure. FIG. 4B illustrates an exploded view of the release mechanism 114 of FIG. 4A, according to one embodiment of the present disclosure.

In one example embodiment, as illustrated in FIGS. 4A and 4B, the release mechanism 114 comprises a frame 402 formed on a side of the first case 102, a first locking member 404 configured to lock with or release from a locking indent 412 of the second case 108 and a second locking member 406 configured to slide along a hollow 408 of the frame 402. In another example embodiment, the first locking member 404 is locked with the locking indent 412 when the second locking member 406 is in a first position, where the second locking member 406 is in contact with the bottom of a stopper 410, and the first locking member 404 is released from the locking indent 412 when the second locking member 406 is in a second position, where the second locking member 406 is in contact with the top of the stopper 410, and is pressed.

Figure 5A:
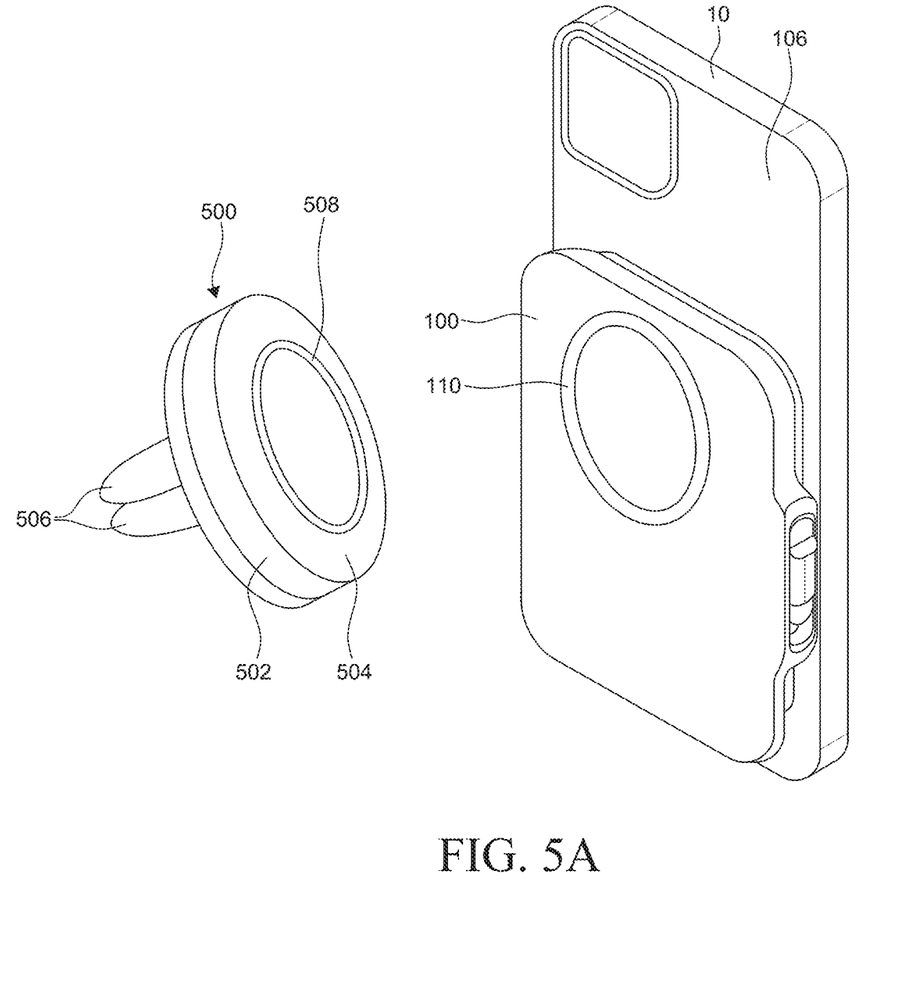
FIG. 5A illustrates a perspective view of the magnetic auxiliary device of FIGS. 1A through 1D with another magnetic auxiliary device for mobile device, according to one embodiment of the present disclosure.

FIG. 5A illustrates a perspective view of the magnetic auxiliary device 100 of FIGS. 1A through 1D with another magnetic auxiliary device for mobile device 10, according to one embodiment of the present disclosure. In one example embodiment, said another magnetic auxiliary device is the magnetic ring 112, as illustrated in FIG. 1D, a magnetic stand (not shown), or a magnetic car mount 500. FIG. 5A illustrates magnetic attraction between a fourth metal plate 508 of the magnetic car mount 500 and the second metal plate 110 of the magnetic auxiliary device 100. A body 502 of the magnetic car mount 500 may be geometrically a prism or cylinder. More preferably, the body 502 is substantially cylindrical as in FIG. 5A. Cylindrical shape is preferable in rotating the magnetic car mount 500 or the magnetic auxiliary device 100 with respect to each other. A plurality of legs 506 is attached about a center of the base 504 and preferably, there are four legs 506. The four legs 506 may form a square layout so that they can be easily inserted into an air vent of a vehicle.

Figure 5B:
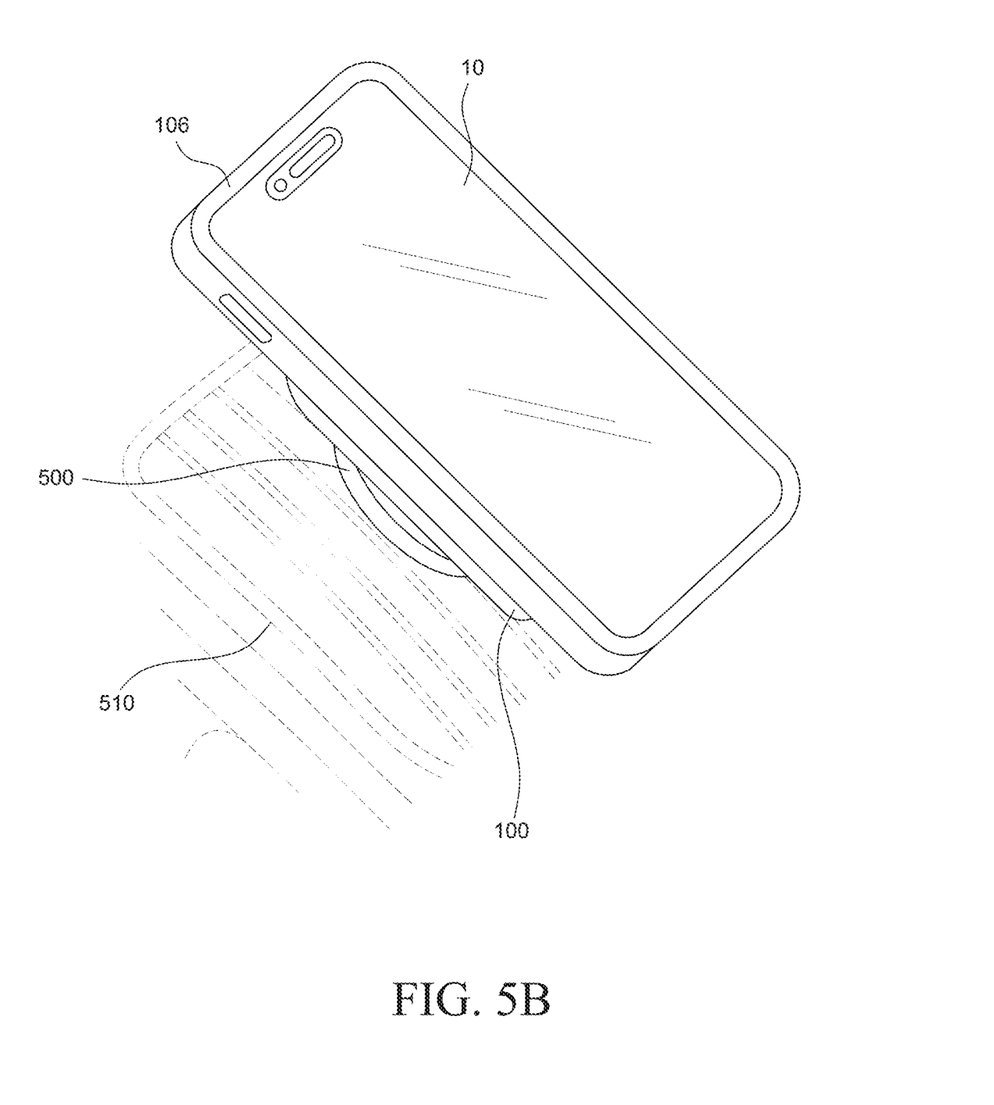
FIG. 5B illustrates a perspective view of the magnetic auxiliary device of FIGS. 1A through 1D coupled with a magnetic support for mobile device, according to one embodiment of the present disclosure.

FIG. 5B illustrates a perspective view of the magnetic auxiliary device 100 of FIGS. 1A through 1D coupled with the magnetic car mount 500, according to one embodiment of the present disclosure. FIG. 5B shows a perspective view of the magnetic car mount 500 such that the magnetic car mount 500 magnetically attracts and retains the case 106 and the magnetic car mount 500 is inserted into and securely retained by an air vent 510 of a vehicle which is comprised of parallel vanes. The plurality of legs 506 of the magnetic car mount 500 are configured to support the magnetic auxiliary device 100 magnetically retained by the magnetic car mount 500 so that the magnetic auxiliary device 100 and the case 106 enclosing the mobile device 10 stand on a flat surface. The friction between the magnetic auxiliary device 100 and the magnetic car mount 500 should be weak enough to allow adjustment of location for each device but strong enough to prevent slipping of the magnetic auxiliary device 100 away from the magnetic car mount 500.

In addition, the plurality of legs 506 of the magnetic car mount 500 is constructed to be received and retained by the air vent 510 of the vehicle. FIG. 5B shows the magnetic car mount 500 inserted into and retained by the air vent 510. By the magnetic attraction between the magnetic car mount 500 and the case 106, the case 106 can be mounted onto the air vent 510. The magnetic car mount 500 is detachably fixed to the air vent 510 and the case 106 can rotate or slide a little with respect to the magnetic car mount 500. Because of friction between the magnetic car mount 500 and the case 106, adjusted rotation or sliding of the case 106 can be maintained so that a user can adjust the angle of the case 106 suitable and convenient for him.

The present disclosure includes multiple embodiments for enhancing the usability of magnetic auxiliary devices using two ferromagnetic plates formed on both sides of the magnetic auxiliary devices. The present disclosure centers on a magnetic card holder device where both sides of the magnetic card holder device is equipped with ferromagnetic metal plates. As a result, one side of the card holder device is magnetically coupled with a mobile device using one ferromagnetic plate to provide a store space for one or more items while the other side of the card holder device is magnetically coupled with another magnetic auxiliary device, such as a magnetic ring, a magnetic stand or a magnetic car mount, using the other ferromagnetic metal plate.

It is to be understood that this disclosure is not limited to particular embodiments or embodiments described, as such may vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided may be different from the actual publication dates which may need to be independently confirmed.

It is noted that, as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order which is logically possible.

Although the foregoing disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the disclosure. It will be appreciated that those skilled in the art will be able to devise various arrangements which, although not explicitly described or shown herein, embody the principles of the disclosure and are included within its spirit and scope. Furthermore, all examples and conditional language recited herein are principally intended to aid the reader in understanding the principles of the disclosure and the concepts contributed by the inventors to furthering the art, and are to be construed as being without limitation to such specifically recited examples and conditions. Moreover, all statements herein reciting principles, embodiments, and embodiments of the disclosure as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary embodiments shown and described herein. Rather, the scope and spirit of present disclosure is embodied by the appended claims.

What is claimed is:

1. A magnetic auxiliary device for mobile device, comprising:
    a first case sized to store at least one item, the first case comprising:
        a first metal plate formed at a position of the first case to magnetically couple with the mobile device or a case of the mobile device; and
    a second case pivotally attached to the first case and pivotable between an open position and a closed position, wherein the first case is uncovered in the open position and the first case is covered in the closed position, the second case comprising:
        a second metal plate formed at a position of the second case to magnetically couple with another magnetic auxiliary device for mobile device,
    wherein when the first metal plate is directly coupled with the case of the mobile device, the first metal plate is to couple with a third metal plate formed in the case of the mobile device,
    wherein the third metal plate is made of a magnet which produces magnetic flux,
    wherein the third metal plate is to allow magnetic waves to pass through an area formed by an inner boundary of a receiver coil of the mobile device, and
    wherein the third metal plate does not overlap with an orthographic parallel projection of the area formed by the inner boundary of the receiver coil.

2. The magnetic auxiliary device of claim 1, wherein when the first metal plate is directly coupled with the mobile device, the first metal plate is to allow magnetic waves to pass through an area formed by an inner boundary of a receiver coil of the mobile device and the first metal plate does not overlap with an orthographic parallel projection of the area formed by the inner boundary of the receiver coil.

3. The magnetic auxiliary device of claim 1, wherein the first case comprises a release mechanism formed on a side of the first case.

4. The magnetic auxiliary device of claim 3, wherein the release mechanism comprises:
    a frame formed on a side of the first case;
        a first locking member configured to lock with or release from a locking indent of the second case; and
    a second locking member configured to slide along a hollow of the frame.

5. The magnetic auxiliary device of claim 4, wherein the first locking member is locked with the locking indent when the second locking member is in a first position and the first locking member is released from the locking indent when the second locking member is in a second position and is pressed.

6. The magnetic auxiliary device of claim 1, wherein the second metal plate is formed in a shape of a ring.

7. The magnetic auxiliary device of claim 1, wherein the second metal plate is formed close to a surface of the second case.

8. The magnetic auxiliary device of claim 1, wherein said another magnetic auxiliary device is a magnetic ring, a magnetic stand, or a magnetic car mount.

9. The magnetic auxiliary device of claim 1, wherein the second case further comprises a silicone holder affixed therein to retain at least one card.

10. A magnetic card holder device for mobile device, comprising:
    a rear case sized to retain a card, the rear case comprising:
        a pocket portion to hold at least one card;
        a release mechanism formed on a side of the rear case; and
        a first metal plate formed at a position of the rear case to magnetically couple with the mobile device or a case of the mobile device; and
    a cover case pivotally attached to the rear case and pivotable between an open position and a closed position, wherein the rear case is uncovered in the open position and the rear case is covered in the closed position, the cover case comprising:
        a second metal plate formed at a position of the cover case to magnetically couple with a support device,
    wherein the release mechanism retains the cover case in the closed position and the release mechanism releases the cover case in the open position,
    wherein when the first metal plate is directly coupled with the case of the mobile device, the first metal plate is to couple with a third metal plate formed in the case of the mobile device,
    wherein the third metal plate is made of a magnet which produces magnetic flux,
    wherein the third metal plate is to allow magnetic waves to pass through an area formed by an inner boundary of a receiver coil of the mobile device, and
    wherein the third metal plate does not overlap with an orthographic parallel projection of the area formed by the inner boundary of the receiver coil.

11. The magnetic card holder device of claim 10, wherein when the first metal plate is directly coupled with the mobile device, the first metal plate is to allow magnetic waves to pass through an area formed by an inner boundary of a receiver coil of the mobile device and the first metal plate does not overlap with an orthographic parallel projection of the area formed by the inner boundary of the receiver coil.

12. The magnetic card holder device of claim 10, wherein the rear case comprises a release mechanism formed on a side of the rear case.

13. The magnetic card holder device of claim 12, wherein the release mechanism comprises:
    a frame formed on a side of the rear case;
        a first locking member configured to lock with or release from a locking indent of the cover case; and
    a second locking member configured to slide along a hollow of the frame.

14. The magnetic card holder device of claim 13, wherein the first locking member is locked with the locking indent when the second locking member is in a first position and the first locking member is released from the locking indent when the second locking member is in a second position and is pressed.

15. The magnetic card holder device of claim 10, wherein the second metal plate is formed in a shape of a ring.

16. The magnetic card holder device of claim 15, wherein the second metal plate is formed close to a surface of the cover case.

17. The magnetic card holder device of claim 10, wherein the support device is a magnetic ring, a magnet stand, or a car mount.

18. A magnetic auxiliary device for mobile device, comprising:
    a first case sized to store at least one item, the first case comprising:
        a first metal plate formed at a position of the first case to magnetically couple with the mobile device or a case of the mobile device; and
    a second case pivotally attached to the first case and pivotable between an open position and a closed position, wherein the first case is uncovered in the open position and the first case is covered in the closed position, the second case comprising:
   a second metal plate formed at a position of the second case to magnetically couple with another magnetic auxiliary device for mobile device,
wherein when the first metal plate is directly coupled with the mobile device, the first metal plate is to allow magnetic waves to pass through an area formed by an inner boundary of a receiver coil of the mobile device and the first metal plate does not overlap with an orthographic parallel projection of the area formed by the inner boundary of the receiver coil.

* * * * *